(12) United States Patent
Watson et al.

(10) Patent No.: US 10,662,896 B2
(45) Date of Patent: May 26, 2020

(54) NOZZLE WITH VARIABLE THROAT AND EXIT AREAS

(71) Applicant: ROLLS-ROYCE plc, London (GB)

(72) Inventors: Jonathan V Watson, Bristol (GB); Jack F Colebrooke, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/840,751

(22) Filed: Dec. 13, 2017

(65) Prior Publication Data

US 2018/0171931 A1 Jun. 21, 2018

(30) Foreign Application Priority Data

Dec. 15, 2016 (GB) .................................. 1621331.6

(51) Int. Cl.
*F02K 1/12* (2006.01)
*F02K 1/15* (2006.01)

(52) U.S. Cl.
CPC ............ *F02K 1/123* (2013.01); *F02K 1/1223* (2013.01); *F02K 1/1246* (2013.01); *F02K 1/15* (2013.01); *F05D 2220/32* (2013.01); *F05D 2260/56* (2013.01)

(58) Field of Classification Search
CPC .......... F02K 1/123; F02K 1/1223; F02K 1/15; F02K 1/12; F02K 1/1246; F05D 2220/32; F05D 2260/32; F05D 2260/56
See application file for complete search history.

(56) References Cited

U.S. PATENT DOCUMENTS

| 2,999,354 | A | * | 9/1961 | Gallo | F02K 1/1246 |
| | | | | | 239/127.3 |
| 4,245,787 | A | * | 1/1981 | Freid | F02K 1/1269 |
| | | | | | 239/265.41 |
| 4,456,178 | A | * | 6/1984 | Jones | F02K 1/1292 |
| | | | | | 239/265.39 |
| 4,552,309 | A | | 11/1985 | Szuminski et al. | |
| 5,269,466 | A | * | 12/1993 | Maguire | F02K 1/1292 |
| | | | | | 239/265.39 |

(Continued)

FOREIGN PATENT DOCUMENTS

GB    2429242 A    2/2007

OTHER PUBLICATIONS

Apr. 17, 2018 Search Report issued in European Patent Application No. 17207398.

(Continued)

*Primary Examiner* — Steven M Sutherland
(74) *Attorney, Agent, or Firm* — Oliff PLC

(57) ABSTRACT

A nozzle for a gas turbine engine. An array of convergent petals hingedly coupled to a nozzle exit of fixed diameter. An array of divergent petals, each divergent petal hingedly coupled to one of the array of convergent petals. A cam surface associated with the array of convergent petals. A pivot point coupled to the array of divergent petals by a first linkage and to a fixed point by a second linkage. A cam follower coupled to the second linkage by a third linkage, the cam follower arranged to abut and travel in contact with the cam surface. An actuator coupled to the cam follower and arranged to translate the cam follower along the cam surface to move the convergent and divergent petals.

14 Claims, 8 Drawing Sheets

(56) References Cited

U.S. PATENT DOCUMENTS

| | | | | |
|---|---|---|---|---|
| 5,494,221 | A | * | 2/1996 | Cot ........................ F02K 1/1223 239/265.19 |
| 5,571,262 | A | | 11/1996 | Camboulives |
| 6,148,608 | A | * | 11/2000 | Martin .................. F02K 1/1223 239/265.33 |
| 6,195,981 | B1 | * | 3/2001 | Hanley ................... F02K 1/008 60/204 |
| 6,299,077 | B1 | | 10/2001 | Harmon et al. |
| 6,375,095 | B1 | * | 4/2002 | Feder ...................... F02K 1/008 239/265.41 |
| 2009/0072044 | A1 | * | 3/2009 | Kehret .................. F02K 1/1223 239/13 |

OTHER PUBLICATIONS

Feb. 14, 2017 Search Report issued in British Patent Application No. 1621331.6.

* cited by examiner

NOZZLE WITH VARIABLE THROAT AND EXIT AREAS

The present disclosure concerns a nozzle for a gas turbine engine. In particular it concerns a convergent-divergent nozzle for a gas turbine engine.

For some aircraft powered by one or more gas turbine engine it is advantageous to change the profile of the exhaust nozzle. A convergent-divergent nozzle has a first section which is convergent to a throat of minimum area. There is then a second, divergent section downstream which permits exhaust gases to expand to an exit area. The throat area is sometimes referred to as A8 whilst the exit area may be referred to as A9, as illustrated in FIG. 2.

For an engine having reheat capability additional combustion is performed in the exhaust nozzle in order to provide thrust increase. This requires the nozzle to have a large throat area. The ratio between the throat and exit areas is at least partially dependent on aircraft flight speed. The ideal relative throat and exit areas, and consequently the ratio between them, is shown in the table:

|  | Ideal A8 | Ideal A9 | A9/A8 |
| --- | --- | --- | --- |
| Subsonic dry | LOW | LOW | LOW |
| Subsonic reheat | HIGH | HIGH | LOW |
| Supersonic dry | LOW | HIGH | HIGH |
| Supersonic reheat | HIGH | V. HIGH | HIGH |

It is known to provide an actuation mechanism for each of the convergent and divergent sections of the exhaust nozzle so that the areas at their respective downstream ends can be set independently. Such an arrangement is shown in FIG. 3. However, providing two sets of actuators is heavy and complex. In particular it is necessary to ensure that the actuators work in concert so that, for example, the exit area A9 is not set to be high when the throat area A8 is low.

According to a first aspect there is provided a nozzle for a gas turbine engine, the nozzle comprising:
- an array of convergent petals hingedly coupled to a nozzle exit of fixed diameter;
- an array of divergent petals, each divergent petal hingedly coupled to one of the array of convergent petals;
- a cam surface associated with the array of convergent petals;
- a pivot point coupled to the array of divergent petals by a first linkage and to a fixed point by a second linkage;
- a cam follower coupled to the second linkage by a third linkage, the cam follower arranged to abut and travel in contact with the cam surface; and
- an actuator coupled to the cam follower and arranged to translate the cam follower along the cam surface to move the convergent and divergent petals.

Advantageously a single actuator is required to control the throat area (at the hinge between the convergent and divergent petals) and exit area (at the end of the divergent petals which is distal to the convergent petals) of the nozzle. Advantageously the nozzle can be actuated to give a small throat area with either a small or a large exit area, and alternatively to give a large throat area with either a small or a large exit area. Advantageously the nozzle is suitable for reheat or dry (no reheat) operations of a gas turbine engine at subsonic or supersonic operations.

The actuator may be coupled to the cam follower through a unison ring. Thus the cam follower may be coupled to the unison ring, for example on a downstream side thereof, and the actuator may also be coupled to the unison ring, for example on an upstream side thereof. Advantageously the unison ring may contain the pressure load from the convergent petals and ensures that the petals open at the same rate.

There may be a cam surface and a cam follower coupled to each convergent petal in the array of convergent petals. Advantageously there is equal movement applied to each cam follower and equal travel on its respective cam surface. Alternatively there may be a cam surface and a cam follower coupled to two or more convergent petals in the array of convergent petals. Advantageously this requires fewer cam surfaces and cam followers so is lighter and simpler.

There may be an actuator coupled to each cam follower. Advantageously each cam follower can be individually controlled. Alternatively there may be an actuator coupled to two or more cam followers. The cam followers may therefore be ganged together. Advantageously the cam followers are actuated in unison.

The second linkage may form a bell crank. The third linkage may be coupled to the second linkage at the pivot point. Advantageously the second linkage may have less mass when the first, second and third linkages are all coupled at the pivot point.

The actuator may comprise a linear actuator. Advantageously linear movement is simple to control. The cam and linkage arrangement may convert the linear movement of the actuator to radial movement of the petals.

The cam follower may comprise a roller. Alternatively it may comprise a wheel or slide. Advantageously the cam follower has a surface which is complementary to the cam surface and therefore smoothly travels along it.

The cam surface may comprise a first portion and a second portion. The first and second portions may form a convex surface. The first portion may be arranged to maintain nozzle throat area. The second portion may be arranged to change the nozzle throat area. The linkages pivot relative to each other to maintain or change the exit area. Advantageously the throat area and exit area of the nozzle are changed independently of each other. Advantageously a single cam follower and cam surface (or a single array of cam followers and cam surfaces) is required, driven by a single actuator (or a single array of actuators), to effect independent alteration of the nozzle throat area and exit area.

The first portion may be between 30% and 45% of the length of the second portion. Advantageously there is sufficient space available for the other components, including the pivot point, fixed points, linkages and cam follower. Advantageously the linkages need not be excessively heavy or stiff to avoid buckling. Advantageously none of the linkages protrudes radially outside or distorts the line of the engine afterbody. Advantageously the afterbody drag is not increased.

The second portion may have an aspect ratio between its length and thickness of between 20% and 40%. Advantageously the cam surface is shallow enough not to subject other parts to high stresses. Advantageously the sensitivity of the cam follower to small movements of the actuator is low so that input errors or perturbations of the actuator do not result in significant or repetitive movements of the nozzle petals. Advantageously the convergent petals need not be longer than desirable in order to accommodate the cam surface. Advantageously no weight is added to the convergent petals and no additional bending moments are applied to upstream components of the engine by any asymmetries of the nozzle.

The array of convergent petals may be an annular array. The array of divergent petals may be an annular array.

Alternatively one or both of the arrays may be linear, for example on the sides of a rectangular nozzle.

According to a second aspect there is provided a gas turbine engine comprising a nozzle as described. The gas turbine engine may be an aero gas turbine engine; that is a gas turbine engine for powering an aircraft.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
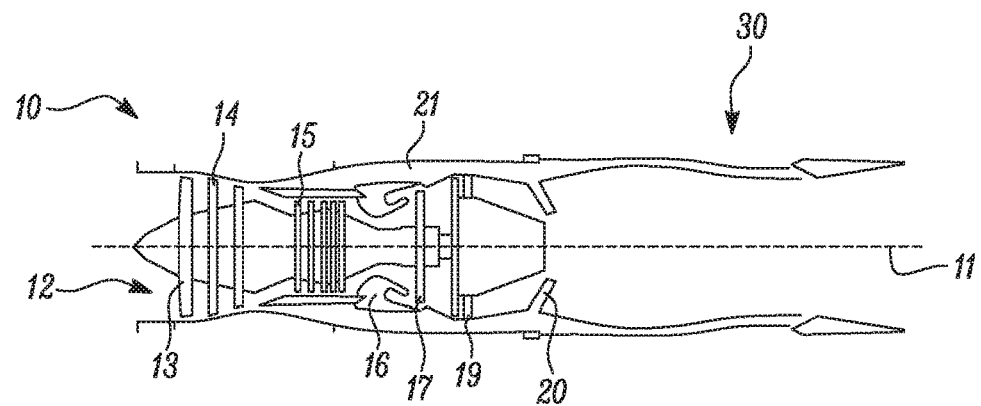
FIG. 1 is a sectional side view of a gas turbine engine.
Figure 2:
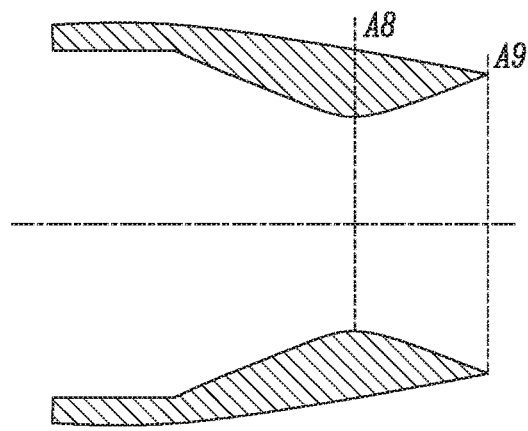
FIG. 2 is a schematic section of a convergent-divergent nozzle.
Figure 3:
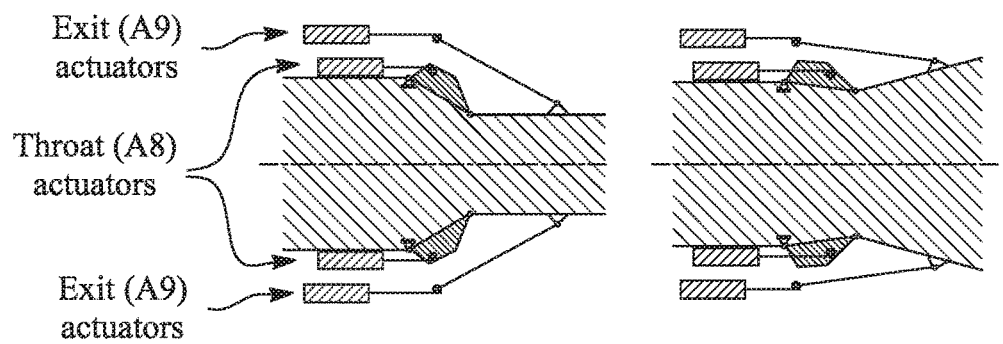
FIG. 3 is a schematic section of a convergent-divergent nozzle having two actuation mechanisms.

With reference to FIG. 1, a gas turbine engine is generally indicated at 10, having a principal and rotational axis 11. The engine 10 comprises, in axial flow series, an air intake 12, a propulsive fan 13, a low-pressure compressor 14, a high-pressure compressor 15, combustion equipment 16, a high-pressure turbine 17, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13. The low-pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the nozzle 20 to provide propulsive thrust. The high-pressure turbine 19 drives the high pressure compressor 15, by a suitable interconnecting shaft; the low-pressure turbine 19 drives the low-pressure compressor 14 and fan 13, by another suitable interconnecting shaft. The expanded air is directed from the exhaust nozzle 20 into a reheat nozzle 30 where additional combustion may occur.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

Figure 4:
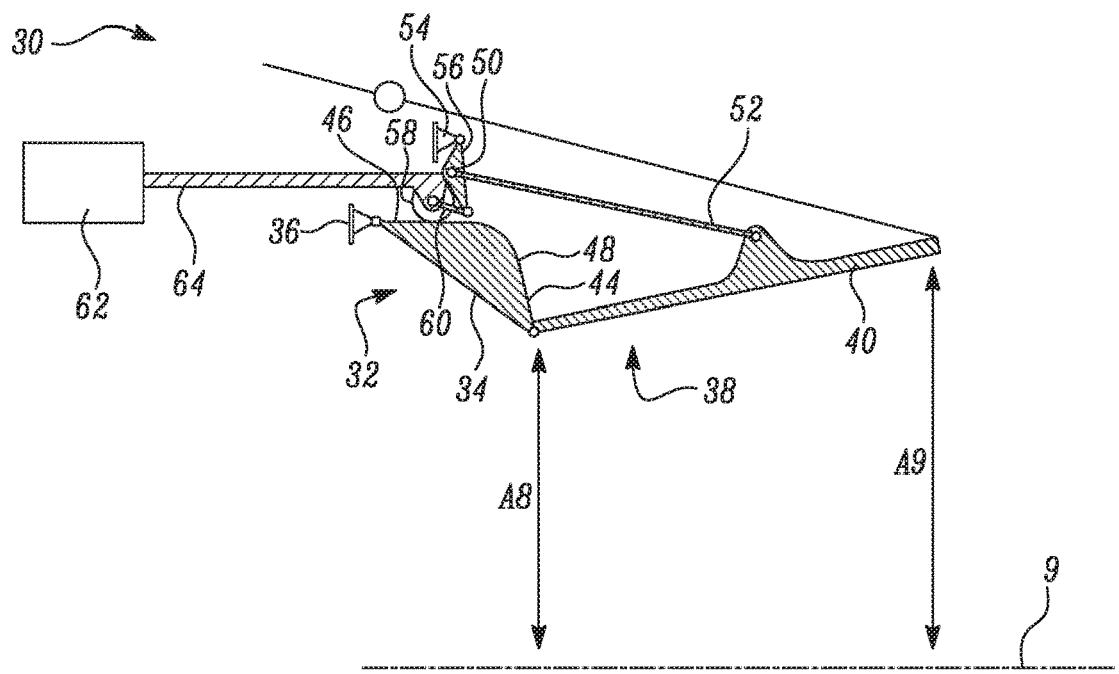
FIG. 4 is a schematic section of a convergent-divergent nozzle having a single actuation mechanism.

FIG. 4 is a more detailed sectional view of a nozzle 30 of the gas turbine engine 10. The nozzle 30 includes a convergent section 32 which comprises an annular array of convergent petals 34. At their upstream ends, nearer to the core of the gas turbine engine 10, the convergent petals 34 are coupled to a fixed exit nozzle 36. The convergent petals 34 are coupled in order to pivot towards and away from the rotational axis 11. Downstream of the convergent petals 34 is a divergent section 38 which comprises an annular array of divergent petals 40. Each divergent petal 40 is hingedly coupled to one of the convergent petals 34 at a hinge 42. The divergent petals 40 are also coupled so that they pivot towards and away from the rotational axis 11.

The hinges 42 at the downstream end of the convergent section 32 define the throat area A8. By pivoting the convergent petals 34 about their hinged coupling to the fixed nozzle exit 36 the throat area A8 is varied from a minimum size to larger, for example for gas turbine engine reheat. The minimum throat area A8 is typically provided by the convergent petals 34 each being angled towards the rotational axis 11. The petals 34 may be arranged to overlap at their downstream ends. The range of movement of the convergent petals 34 will typically be set so that they always converge somewhat towards the rotational axis 11 but extend more axially than for the minimum throat area A8.

The downstream end of the divergent section 38 defines the exit area A9. By pivoting the divergent petals 40 about the hinges 42 the exit area A9 is varied from a minimum area which is similar to or slightly larger than the minimum throat area A8 up to a much larger area.

The nozzle 30 includes a cam surface 44 associated with the convergent petals 34. As illustrated the cam surface 44 is formed by the radially outer surface of one or more of the convergent petals 34. The cam surface 44 may include two portions, a first portion 46 and a second portion 48. The first and second portions 46, 48 together form a convex surface. There may be a radius at the angle between the first and second portions 46, 48 to provide a smooth cam surface 44. Thus the convergent petal, first portion 46 and second portion 48 may form a triangular body. The first and second portions 46, 48 may be the same length so that the triangular body is isosceles (petal 34 of different length) or equilateral (petal 34 the same length as the portions 46, 48). Alternatively the first and second portions 46, 48 may be different lengths to each other to give an acute triangle which may be scalene. The petal 34 may be the same length as one of the portions 46, 48 or a different length to both portions 46, 48.

The cam surface 44 may span the full width of a convergent petal 34 or it may be narrower than this. The cam surface 44 may be a solid body or may be a thin strip which is attached to the convergent petal 34 at each axial end but is spaced therefrom for the majority of the first and second portions 46, 48.

There may be one cam surface 44 on each convergent petal 34. Alternatively there may be fewer cam surfaces 44 than petals 34, for example only on every other petal 34. A cam surface 44 may bridge between two or more convergent petals 34. Alternatively there may be more than one cam surface 44 on any of the convergent petals 34, provided that the cam surfaces 44 are narrower than the petals 34.

A pivot point 50 is coupled to the divergent section 38 by a first linkage 52. The first linkage 52 has fixed length and is pivotably connected to the divergent section 38, for example to a flange forming part of one of the divergent petals 40. The first linkage 52 may be coupled towards the downstream end of the divergent section 38 so that relatively small movements of the first linkage 52 cause changes in the exit area A9. The first linkage 52 may be coupled to one of the divergent petals 40 or may be coupled to two or more of the petals 40. There may be the same number of pivot points 50 as divergent petals 40, which one pivot point 50 coupled to each divergent petal 40. Alternatively there may be fewer pivot points 50 each coupled to two or more of the petals 40 by first linkages 52.

The pivot point 50 is also pivotably coupled to a fixed point 54 by a second linkage 56. There is one second linkage 56 for each pivot point 50. Thus the divergent petal 40 is indirectly coupled to the fixed point 54 by virtue of the first and second linkages 52, 56 which can pivot with respect to each other. The second linkage 56 may be coupled to the pivot point 50 at one of its ends or at an intermediate position along its length. There may be the same number of fixed points 54 as pivot points 50 with each pivot point 50 coupled to one fixed point 54 by a second linkage 56. Alternatively there may be fewer of the fixed points 54 than pivot points 50 with each pivot point 50 coupled to one of the fixed points 54 but at least some of the fixed points 54 coupled to more than one of the pivot points 50.

A cam follower 58 abuts the cam surface 44. The cam follower 58 may be a wheel or roller as illustrated in FIG. 4. The cam follower 58 is arranged to abut and to travel along the cam surface 44 in contact with it. Other shapes are also suitable for the cam follower 58, for example a slide with a complementary shape to the cam surface 44. Preferably there is one cam follower 58 for each cam surface 44. Thus there may be the same number of cam followers 58 as convergent petals 34. In some examples there may be a cam follower 58 only for alternate cam surfaces 44 or a similar pattern. Advantageously, it may be possible to have a first set of cam surfaces 44 on which the cam followers 58 moves and then a second set to which the cam followers 58 can be transferred during maintenance. Thus the cam surfaces 44 do not need to be replaced or repaired as frequently when they are not all used. Alternatively a cam follower 58 may bridge two or more cam surfaces 44.

A third linkage 60 couples between the cam follower 58 and the second linkage 56. The third linkage 60 is pivotably coupled to the cam follower 58, for example at its centre of rotation where the cam follower 58 is a wheel. There is one third linkage 60 for each cam follower 58. The third linkage 60 is also pivotably coupled to the second linkage 56, for example at its end which is distal to the fixed point 54. In some arrangements the second and third linkages 56, 60 are coupled at the pivot point 50 and are therefore mutually coupled to the first linkage 52. In other arrangements the second and third linkages 56, 60 are coupled at one position and the first and second linkages 52, 56 are coupled at a different position. In this case the second linkage 56 may resemble or be formed as a bell crank. There may be the same number of third linkages 60 as there are second linkages 56. In some examples there are more or fewer third linkages 60 than second linkages 56.

An actuator 62 is coupled to a unison ring 64. The cam follower 58 is mounted to the unison ring 64. The actuator 62 is arranged to translate the cam follower 58 along the cam surface 44. When the cam follower 58 is a wheel or roller the actuator 62 may be coupled to the centre of rotation of the cam follower 58. When the cam follower 58 has a different shape the actuator 62 may be coupled to a different part of the cam follower 58. The actuator 62 may be pivotably coupled to the cam follower 58. Translation of the actuator 62 causes the linkages 52, 56, 60 to move and rotate relative to each other in a known sequence as described below. The actuator 62 may be a linear actuator 62 which is aligned approximately parallel to the rotational axis 11 of the engine 10.

There may be one actuator 62 directly coupled to each cam follower 58 with no unison ring 64. Advantageously variations between cam surfaces 44 and cam followers 58 can be accommodated. Alternatively one actuator 62 may be coupled to two or more cam followers 58 so that they are constrained to translate along their respective cam surfaces 44 together. Thus the unison ring 64 may be replaced by a plurality of partial rings which couple two or more cam followers 58 together. Advantageously fewer actuators 62 are required and there is less opportunity for misalignment of the convergent petals 34 and/or divergent petals 40 by different amounts of actuation.

Figure 5:
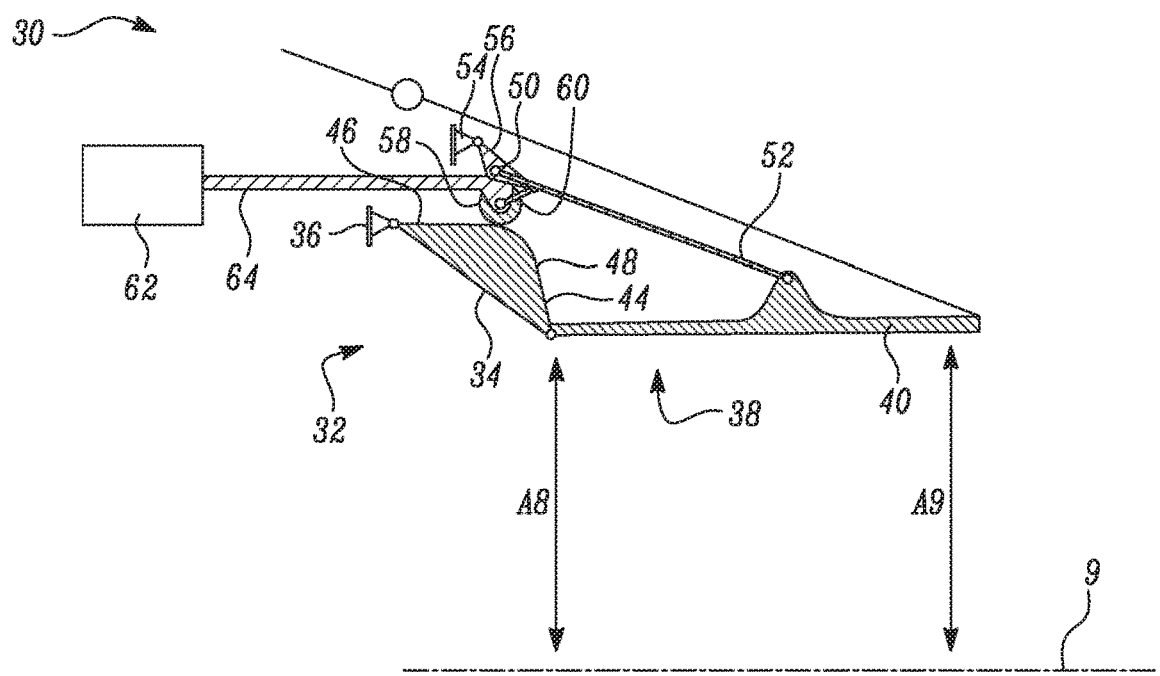
FIG. 5, FIG. 6 and FIG. 7 show the nozzle of FIG. 4 in different configurations.
Figure 6:
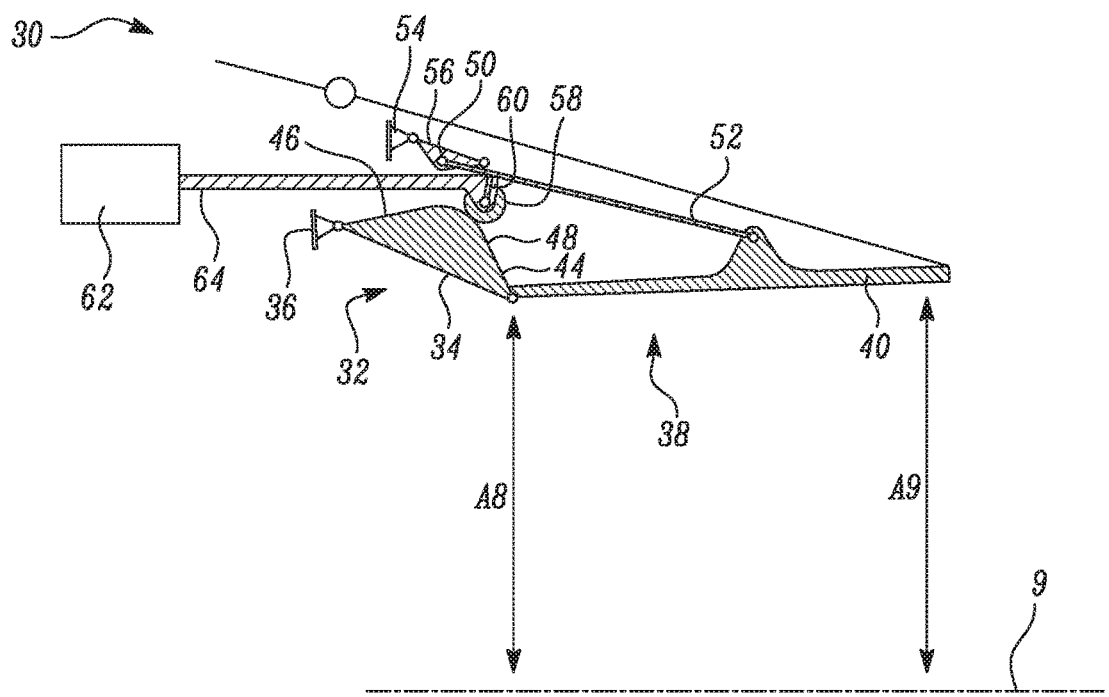
Figure 7:
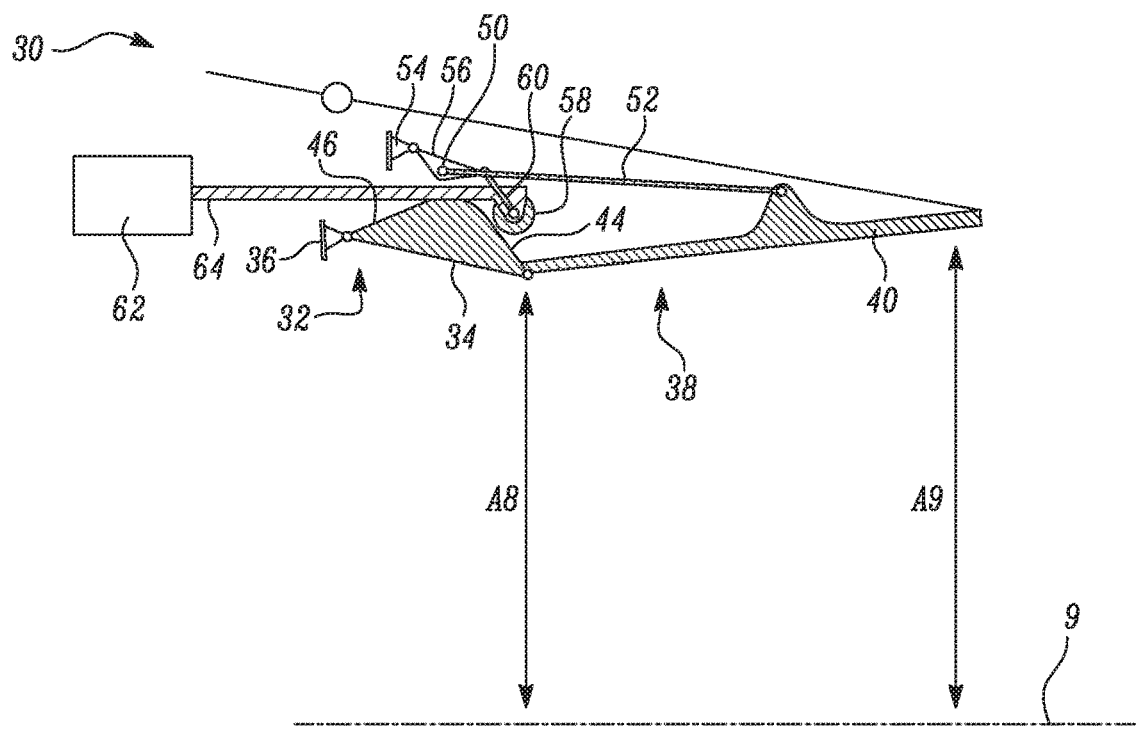

The nozzle 30 is illustrated in a first configuration in FIG. 4. The nozzle 30 is illustrated in second, third and fourth configurations in FIG. 5, FIG. 6 and FIG. 7 respectively. A single actuator 62, cam follower 58, cam surface 44 and corresponding linkages 52, 56, 60 is described. Nonetheless it is to be understood that where more than one such arrangement is provided around the nozzle 30 they would each act together to move the nozzle 30 through the configurations described.

In the first configuration (FIG. 4) the actuator 62 and unison ring 64 are fully retracted. The cam follower 58 sits on the first portion 46 of the cam surface 44, that part that is close to the fixed nozzle exit 36. The convergent petals 34 are therefore angled well towards the rotational axis 11 of the engine 10 to give the minimum throat area A8. The second linkage 56 is aligned approximately radially between the fixed point 54 and the third linkage 60. Thus the first linkage 52 is drawn axially forwards meaning the divergent petals 40 are angled well away from the rotational axis 11 so that the exit area A9 is large. The first configuration is suitable for dry (no reheat) supersonic operation of the engine 10.

In the second configuration (FIG. 5) the actuator 62 and unison ring 64 have been actuated a small amount downstream, translated to the right as illustrated. This has translated the cam follower 58 along the cam surface 44 but it remains on the first portion 46. Translation of the cam follower 58 has caused the second linkage 56 to pivot about the fixed point 54 due to its coupling to the cam follower 58 through the third linkage 60. Consequently the first linkage 52 has been translated downstream and rotated about the pivot point 50. This has the effect of rotating the divergent petals 40 about the hinge 42 with the convergent petals 34. Thus the exit area A9 is reduced relative to the first configuration. The second configuration is suitable for dry (no reheat) subsonic operation of the engine 10.

In the third configuration (FIG. 6) the actuator 62 and unison ring 64 have been translated further downstream, to the right. This causes the cam follower 58 to move onto the second portion 48 of the cam surface 44. Consequently the downstream end of the convergent petals 34 are drawn away from the rotational axis 11 and the throat area A8 is increased relative to the first and second configurations. The second linkage 56 is pivoted further about the fixed point 54 and so the angle between the divergent petals 40 and the rotational axis 11 is not affected. The divergent petals 40 are, however, drawn radially away from the rotational axis 11 so the exit area A9 is increased relative to the second configuration. The third configuration is suitable for partial reheat subsonic operation of the engine 10.

In the fourth configuration (FIG. 7) the actuator 62 and unison ring 64 have been translated even further downstream, to the right, to their maximum extension. This causes the cam follower 58 to move along the second portion 48 of the cam surface 44. Consequently the downstream end of the convergent petals 34 are drawn further away from the rotational axis 11 and the throat area A8 is increased to its maximum size. Thus the throat area A8 is greater than in the first, second or third configurations. The second linkage 56 is pivoted further about the fixed point 54 and so the angle between the divergent petals 40 and the rotational axis 11 is increased. The exit area A9 is consequently increased to its maximum size. Thus the exit area A9 is greater than in the first, second or third configurations. The fourth configuration is suitable for subsonic or supersonic reheat operation of the engine 10.

The actuator 62 and unison ring 64 can be retracted upstream, translation to the left in the figures. Consequently the nozzle 30 is moved from the fourth configuration to the third configuration then the second configuration and finally to the first configuration. The actuator 62 and unison ring 64 do not need to be fully extended before being retracted. For example, it is possible to extend the actuator 62 and unison ring 64 from the first configuration through the second configuration to the third configuration and then to retract them to the first or second configuration without extending them to the fourth configuration. Alternatively the actuator 62 and unison ring 64 may be extended from the first to the second configuration and then retracted to the first configuration without extending to the third or fourth configurations. The configurations are determined by the engine 10 operation required in use.

Advantageously there may be a control system which controls translation of the actuator 62. The control system may form part of an engine control system. Alternatively it may be an independent control system which reacts to or receives signals from an engine control system.

Preferably the actuator 62 may be arranged to fail to fully extended. Advantageously this minimises the risk of engine surge due to nozzle failure because the exit of the nozzle is fully opened (exit area A9 maximum size).

Figure 8:
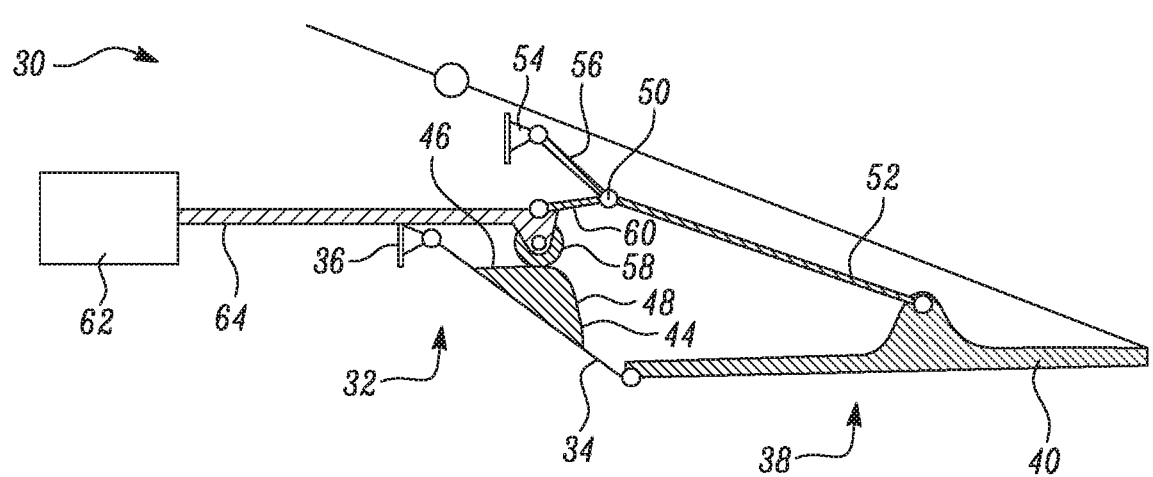
FIG. 8 is a schematic section of a convergent-divergent nozzle in an alternative configuration.

FIG. 8 shows an alternative arrangement of the nozzle 30 in the second configuration. The alternative arrangement differs in two respects: firstly the coupling of the linkages 52, 56, 60 and secondly in the design of the cam surface 44. Firstly, the third linkage 60 is coupled to the end of the second linkage 56 (distal from the fixed point 54) instead of to an intermediate point on the second linkage 56. Thus the third linkage 60 is coupled to the second linkage 56 at the pivot point 50 where the second linkage 56 is coupled to the first linkage 52. Consequently the second linkage 56 has a simple rod or clevis form instead of being a bell crank.

The operation of the nozzle 30 is the same as described with respect to FIG. 4 to FIG. 7. The relative lengths of the first, second and third linkages 52, 56, 60 are designed in order that they pivot as required to change the angle and position of the convergent and divergent petals 34, 40 in response to translation of the actuator 62.

Secondly, the cam surface 44 is truncated relative to the axial length of the convergent petals 34. As illustrated it forms a radiused triangular shape mounted to or integrally formed in the axial centre of the convergent petal 34. However, it may alternatively be offset towards the upstream or downstream end of the convergent petal 34. As discussed above, the first portion 46 and second portion 48 of the cam surface 44 may be of equal or different lengths. The angle between the first and second portions 46, 48 may be 90°, where the portions 46, 48 are the same length, or may be smaller or greater than 90° where the portions 46, 48 have different lengths.

Figure 9:
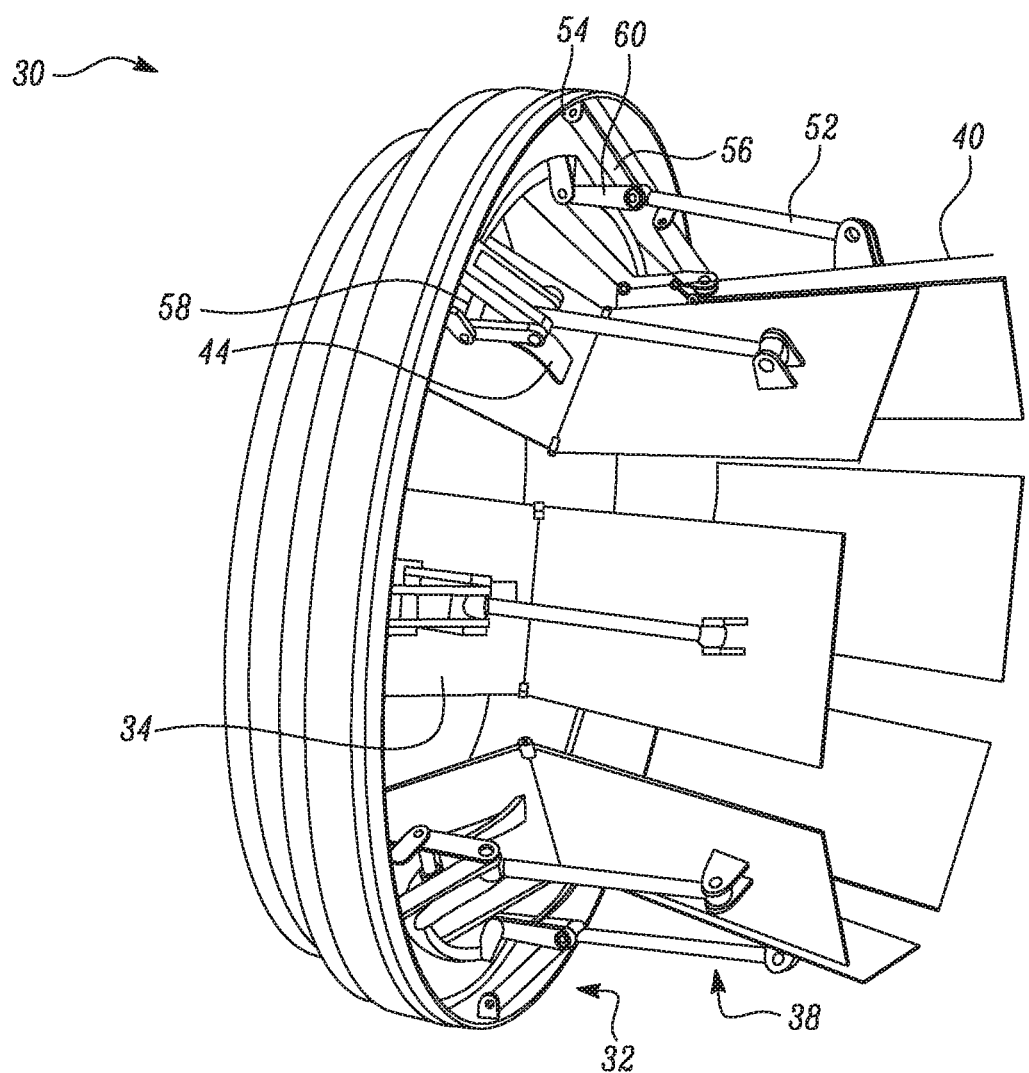
FIG. 9 is a perspective illustration of the nozzle of FIG. 8.

FIG. 9 is a perspective drawing of the alternative nozzle 30 (FIG. 8) in the first configuration. Although there are spaces between adjacent pairs of convergent petals 34 and between adjacent pairs of divergent petals 40 it will be understood that this is for clarity. In some embodiments there are intermediate sealing segments or plates between adjacent pairs of petals 34, 40. In other embodiments the petals 34, 40 are circumferentially wider so that they overlap in some configurations and abut in other configurations. In other embodiments the petals 34, 40 are connected to skirt pieces, which may be flexible skirt pieces, which act to seal the spaces between adjacent convergent petals 34 and between adjacent divergent petals 40.

There is a cam surface 44 provided on each convergent petal 34. There is also a cam follower 58, a first linkage 52, a second linkage 56, a third linkage 60, a pivot point 50, a fixed point 54 and an actuator 62 for each cam surface 44.

As can be seen in FIG. 9 the second and third linkages 56, 60 may take the form of a clevis. The pivot point 50 may be a tangentially extending pin or rod to which the ends of the linkages 56, 60 are pivotably connected. Alternatively the pivot point 50 may be in the form of a sphere or ball with the linkages 56, 60 arranged to engage it, for example by frictional contact. The pivot point 50 may be integrally formed with the first linkage 52 or may be independent thereof.

Figure 14:
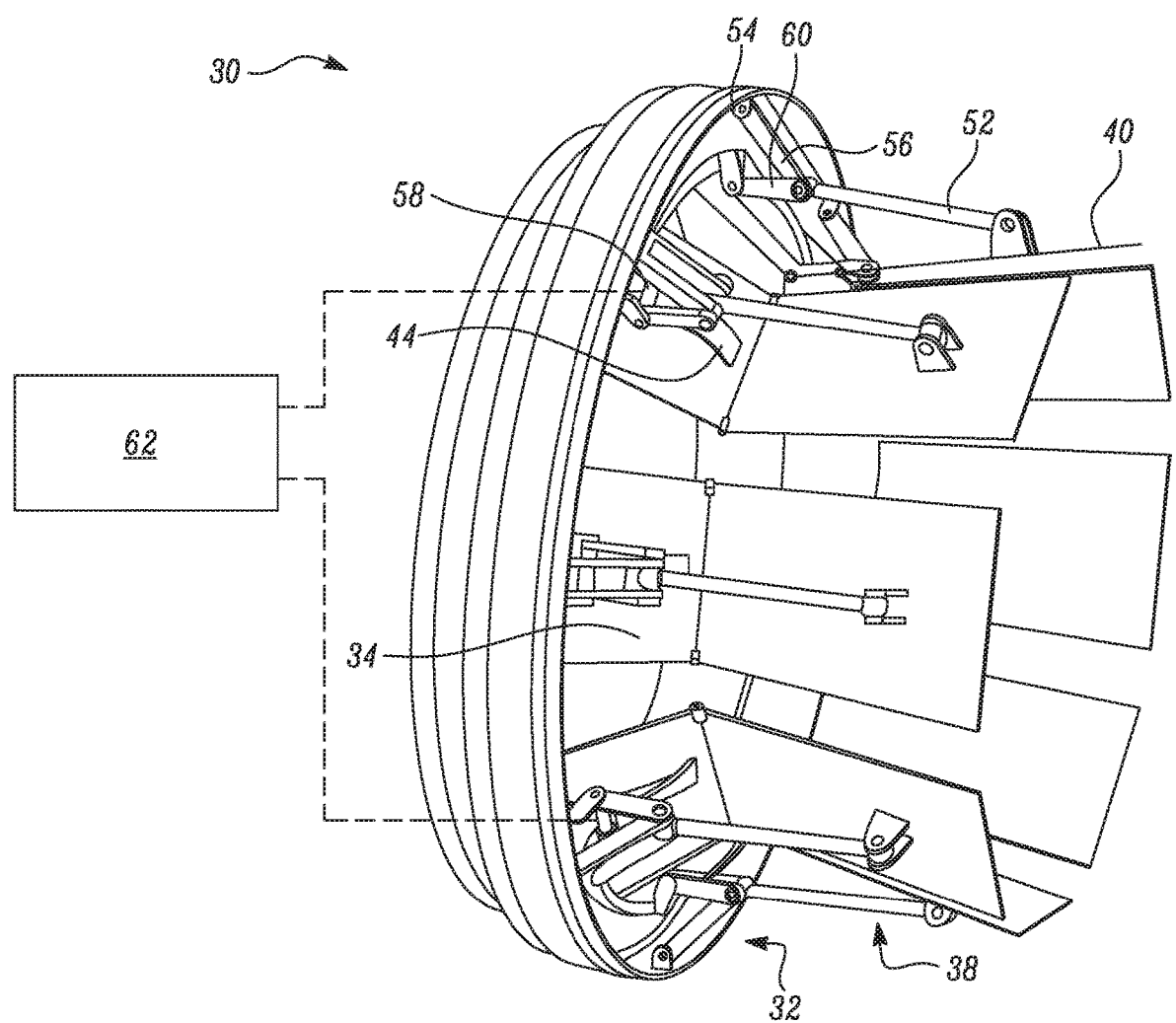
FIG. 14 is a perspective illustration of an embodiment of a nozzle.

The cam follower 58 may be in the form of a cylindrical roller. When the third linkage 60 has the form of a clevis it may straddle the cam surface 44 and pivotably couple to the ends of the cam follower 58. The cam follower 58 may therefore be a cylindrical roller which is longer than the cam surface 44 is wide. Optionally the cylindrical cam follower 58 may include a flange or other protrusion at one or both of its ends. The flanges may overhang the edge of the cam surface 44 and therefore maintain the alignment of the cam follower 58 relative to the cam surface 44. Advantageously torsional strain on the linkages 52, 56, 60 and actuator 62 is prevented. Also, as shown in FIG. 14, the actuator 62 may be coupled to two or more cam followers 58.

Figure 10:
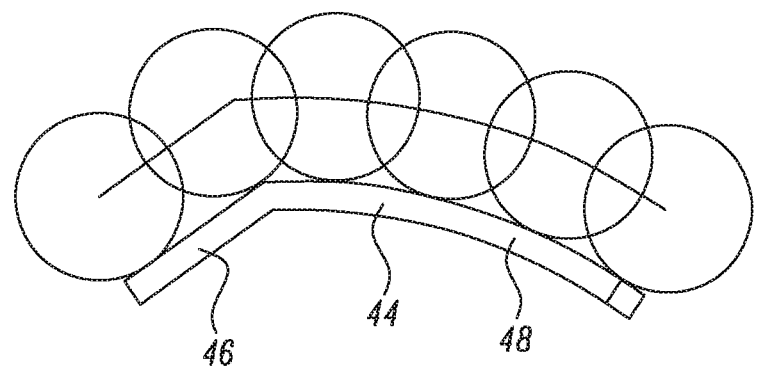
FIG. 10 is a sketch of a cam surface profile.

FIG. 10 shows an alternative shape for the cam surface 44. The first portion 46 of the cam surface 44 is substantially flat. The second portion 48 is convexly curved in one plane. Alternatively both portions 46, 48 may be curved, with the same radius of curvature or different radii, or both portions 46, 48 may be planar. One or both portions 46, 48 may be curved in two planes provided that the cam follower 58 is correspondingly shaped. For example, the cam surface 44 may include an axially extending trough whilst being convexly curved for a least a portion of its length.

As shown in FIG. 10 the second portion 48 of the cam surface 44 is longer than the first portion 46. For example, the second portion 48 may be twice as long as the first portion 46. Thus the first portion 46 is approximately 30% of the length of the second portion 48. In other examples the first portion 46 may be up to 45% of the length of the second portion 48. Advantageously these ratios balance providing sufficient length that there is space for the other components and ensuring that none of the linkages are too long or positioned too far from the rotational axis 11. Advantageously the linkages do not require additional mass and stiffness to prevent buckling and do not increase afterbody drag because they do not protrude radially outside the line of the afterbody.

Figure 11:
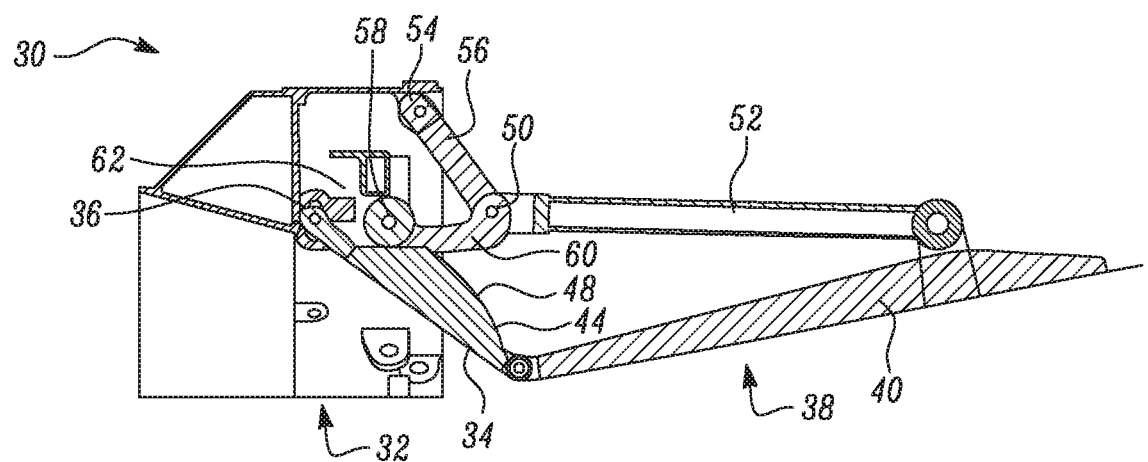
FIG. 11 is a schematic illustration of a convergent-divergent nozzle in a further configuration.
Figure 12:
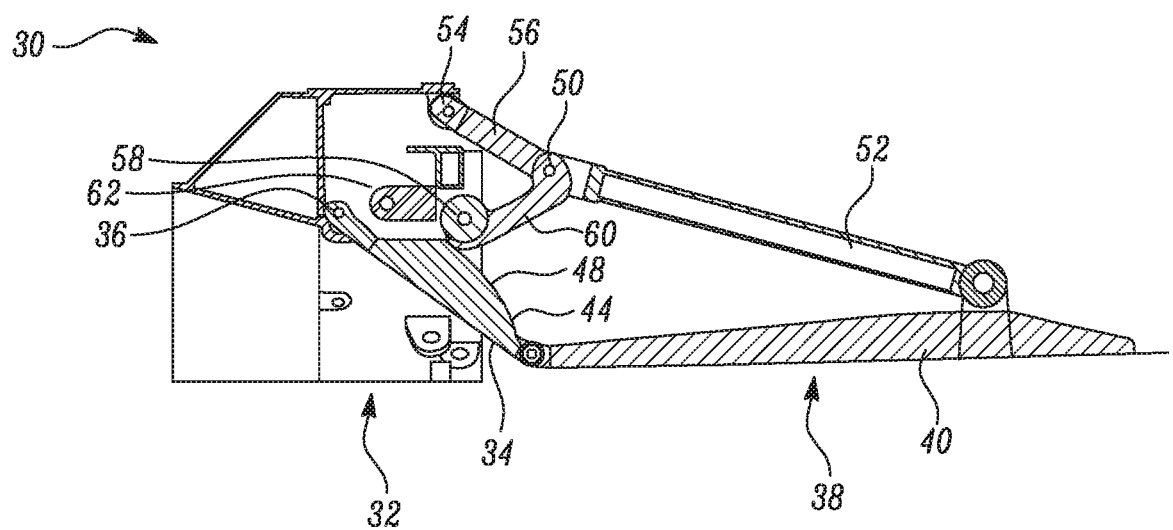
FIG. 12 and FIG. 13 show the nozzle of FIG. 11 in different configurations.
Figure 13:
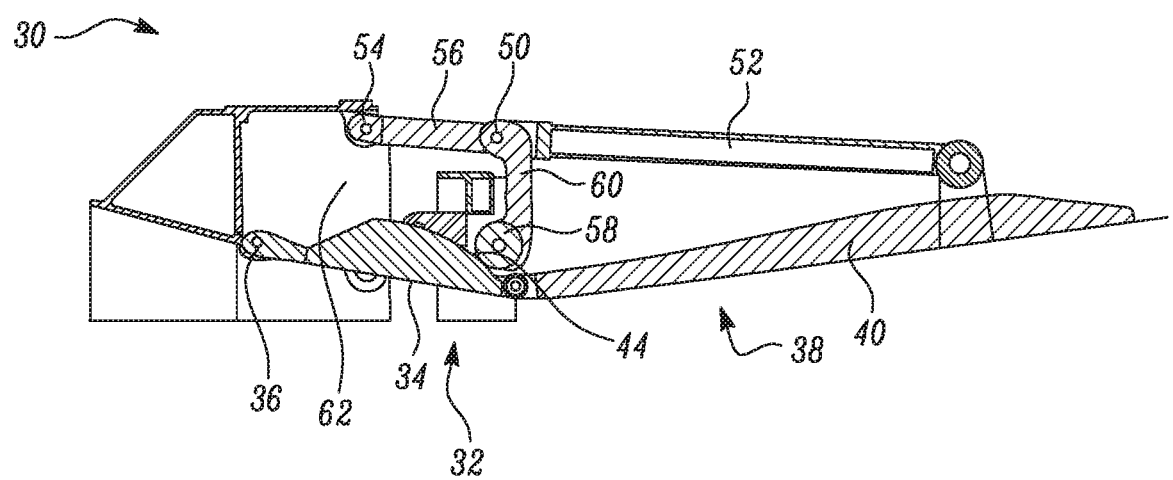

FIG. 11, FIG. 12 and FIG. 13 show an alternative convergent-divergent nozzle 30 incorporating the cam surface 44 shown in FIG. 10. The figures correspond to FIG. 4, FIG. 5 and FIG. 7 and show the first, second and fourth configurations of the nozzle 30.

The cam surface 44 may be configured so that the second portion 48 has an aspect ratio of 20% to 40% between its length and thickness, where length is measured in the planar or curved plane of the cam surface 44 extending in the axial direction. Advantageously, this range balances the length of the petals 34 and the sensitivity of the cam follower 58. If the aspect ratio is higher the cam surface 44 is steep so the parts are subjected to higher stresses. Additionally a small movement of the cam follower 58 along the surface results in a large change of angle and/or position of the petals 34, 40. Thus a high aspect ratio cam surface 44 is sensitive to errors in the input from the actuator 62. Conversely a lower aspect ratio requires a longer convergent petal 34 on which to mount the cam surface 44. Consequently the nozzle 30 is longer and therefore heavier. This may also apply strain to upstream components of the engine 10 because any asymmetries will increase the applied bending moment.

The first portion 46 of the cam surface 44 is arranged to maintain the nozzle throat area A8 and the second portion 48 is arranged to change the nozzle throat area A8. Thus in the first and second configurations, discussed with respect to FIG. 4 and FIG. 11, FIG. 5 and FIG. 12, the cam follower 58 is at positions on the first portion 46 of the cam surface 44 and so the throat area A8 is maintained constant because the convergent petals 34 are not moved. In the third and fourth configurations, FIG. 6 and FIG. 13, FIG. 7, the cam follower 58 has moved onto the second portion 48 of the cam surface 44 which causes the throat area A8 to change because the angle between the convergent petals 34 and the rotational axis 11 is altered (throat area A8 increased when the actuator 62 is extended downstream and decreased when the actuator is retracted upstream).

The alignments of the linkages 52, 56, 60 is dependent on the number of cam surfaces 44, cam followers 58, pivot points 50, actuators 62 and fixed points 54. Thus for example, where the second linkage 56 is described as extending radially it will be understood that where there is not a one-to-one correlation between convergent petals 34 and pivot points 50 it will also include a circumferential component.

Although an annular nozzle 30 has been described the nozzle 30 may alternatively have a different shape. For example, the nozzle 30 may be a rectangular nozzle having four sides. There may be one or more convergent petal 34 on any of its sides. There may be one or more divergent petal 40 on any of its sides.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A nozzle for a gas turbine engine comprising:
   an array of convergent petals hingedly coupled to a nozzle exit of fixed diameter;
   an array of divergent petals, each divergent petal hingedly coupled to one of the array of convergent petals;
   a cam surface associated with the array of convergent petals;
   a pivot point coupled to the array of divergent petals by a first linkage and to a fixed point by a second linkage;
   a cam follower coupled to the second linkage by a third linkage pivotably coupled to the cam follower, the cam follower arranged to abut and travel in contact with the cam surface; and
   an actuator coupled to the cam follower and arranged to translate the cam follower along the cam surface to move the convergent and divergent petals,
   wherein the cam surface comprises a first portion and a second portion, the first and second portions forming a convex surface; the first portion arranged to maintain a nozzle throat area and the second portion arranged to change the nozzle throat area.

2. The nozzle as claimed in claim 1, wherein the actuator is coupled to the cam follower through a unison ring.

3. The nozzle as claimed in claim 1, wherein there is a cam surface and a cam follower coupled to each convergent petal in the array of convergent petals.

4. The nozzle as claimed in claim 1, wherein there is an actuator coupled to each cam follower.

5. The nozzle as claimed in claim 1, wherein there is an actuator coupled to two or more cam followers.

6. The nozzle as claimed in claim 1, wherein the third linkage is coupled to the second linkage at the pivot point.

7. The nozzle as claimed in claim 1, wherein the actuator comprises a linear actuator.

8. The nozzle as claimed in claim 1, wherein the cam follower comprises a roller.

9. The nozzle as claimed in claim 1, wherein the first portion is between 30% and 45% of the length of the second portion.

10. The nozzle as claimed in claim 1, wherein the second portion has an aspect ratio between its length and thickness of between 20% and 40%.

11. The nozzle as claimed in claim 1, wherein the array of convergent petals is an annular array.

12. The nozzle as claimed in claim 1, wherein the array of divergent petals is an annular array.

13. A gas turbine engine comprising the nozzle as claimed in claim 1.

14. A nozzle for a gas turbine engine comprising:
   an array of convergent petals hingedly coupled to a nozzle exit of fixed diameter;
   an array of divergent petals, each divergent petal hingedly coupled to one of the array of convergent petals;
   a cam surface associated with the array of convergent petals;
   a pivot point coupled to the array of divergent petals by a first linkage and to a fixed point by a second linkage;
   a cam follower coupled to the second linkage by a third linkage such that the cam follower is configured to push and pull the second linkage via the third linkage, the cam follower arranged to abut and travel in contact with the cam surface; and
   an actuator coupled to the cam follower and arranged to translate the cam follower along the cam surface to move the convergent and divergent petals.

* * * * *